United States Patent Office 3,741,938
Patented June 26, 1973

3,741,938
PROCESS FOR THE PRODUCTION OF THERMOSTABLE POLYMERS
Yoshio Iwakura and Keikichi Uno, Tokyo, and Kazuma Niume, Kawasaki, Japan, assignors to Maruzen Oil Company Limited, Osaka, Japan
No Drawing. Filed Apr. 16, 1971, Ser. No. 134,890
Claims priority, application Japan, Dec. 30, 1970, 45/129,896
Int. Cl. C08g 22/00
U.S. Cl. 260—77.5 AA
20 Claims

ABSTRACT OF THE DISCLOSURE

A process is provided for producing thermostable polymers from two different monomers, at least one of which is solid at the polymerization temperature. The process comprises dissolving a diisocyanate generator and another monomer such as a diamine, diol or diaminodicarboxylic acid in a solvent, removing the solvent from the resulting solution to obtain a mixture of above monomers mixed intimately at a molecular level, then heating said mixture in the solid phase to polymerize the two different monomers.

BACKGROUND OF THE INVENTION

It is known that a monomer such as p-cyano-benzonitril-N-oxide, p-phenylenediacrylic ester, ε-aminocaproic acid or the like can be homopolymerized in a solid phase. Heretofore, it has not been known to copolymerize different monomers in a solid phase to produce a copolymer having a high degree of polymerization.

Furthermore, for example, it is impossible to carry out a melt polymerization of the monomers of a high melting point which are solid at the polymerization temperature in accordance with conventional methods. Also, in the case of solution polymerization of such monomers, the conventional method are accompanied by some objectionable problems, such as the vaporization or decomposition of the solvent, and the degree of the polymerization is low even if the solution polymerization is accomplished. Up to the present time, a method to produce high polymers from two different monomers of a high melting point which are solid at the polymerization temperature has not been offered.

SUMMARY OF THE INVENTION

We have studied the polymerization of monomers of a high melting point which are solid at the polymerization temperature, and have found that the polymerization of a diisocyanate generator of a high melting point with diamine, diol, or diaminodicarboxylic acid of a high melting point can be carried out in a solid phase by means of a special operation to provide highly polymerized thermostable polymers. The method comprises dissolving two different monomers of a high melting point in a suitable solvent, removing the solvent from the solution to provide a mixture of the different monomers mixed intimately at a molecular level, and then heating said mixture at the polymerization temperature.

Further, we have found that the new method is effective not only when both monomers to be polymerized are solid at the polymerization temperature, but also when one monomer is solid and the other monomer is liquid incapable of dissolving the other monomer. That is, according to the invention, a highly polymerized polymer is obtained by heating the mixture of both monomers intimately mixed at a molecular level even if one monomer is solid and the other monomer is liquid at the polymerization temperature and a highly polymerized polymer cannot be obtained using conventional processes.

An objects of this invention is to provide a process for polymerizing two different monomers having a high melting point and functional groups as described above in a solid phase, and another object is to provide a process for producing a polymer excellent in thermal stability by polymerization in a solid phase of such monomers in a satisfactory yield.

DETAILED DESCRIPTION OF THE INVENTION

In polymerization monomers of such a high melting point in a solid phase, highly polymerized polymer will not be obtained in a satisfactory yield from a mixture prepared by means of mechanical stirring and mixing of two different monomers to be polymerized in which the degree of the mixing is insufficient, even if polymer of a low polymerization degree is obtained.

"Mixture of two different monomers mixed intimately at the molecular level" mentioned above does not denote the state in which the monomers are mixed with one another as a mass consisting of a number of molecules, but the state in which a molecule of each monomer is substantially separated into individual molecules and individual molecules of each monomer and adjacent molecules of the other monomer are mixed intimately so as to keep in contact with one another. Each monomer must be mixed intimately at the molecular level in order to obtain a polymer having a high degree of polymerization by means of polymerization in a solid phase. The mere mechanical mixing of the monomers to be polymerized only provide a mixture in which a mass of molecules of each monomer is combined.

The intimate mixture of monomers is obtained, for example, by dissolving 2,2' - bis - p-N-phenoxycarbonylaminophenyl - 5,5' - bibenzimidazole and 2,2'-p-diaminophenyl-5,5'-bibenzimidazole in a solvent and thereafter removing the solvent from the solution. It is apparent from the activation energy of the dissociation of the bisphenylurethane, 2,2'-bis-p-N-phenoxycarbonylaminophenyl-5,5'-bibenzimidazole, in the mixture of these monomers that said mixture is mixed intimately at a molecular level. That is, the activation energy of the dissociation of the bisphenylurethane in the mixture of monomers obtained by the above method is 18 Kcal./mol. and the activation energy of the dissociation of the bisphenylurethane in the mixture of monomers obtained by the mechanical mixture of the above two kinds of monomers is 36 Kcal./mol. The value of the activation energy of the former is almost the same as that of the dissociation of phenylurethane in the presence of amine in the solution described, for example, in the Journal of the American Chemical Society, vol. 79, p. 73 (1957). The activation energy of the polycondensation of the mixture of the former is 21 Kcal./mol and that of the latter is 85 Kcal./mol. That means that the inherent viscosity of the polymer obtained and the yield obtained in the case of the former are better than those of the latter.

The diisocyanate generators useful in the invention are bisphenylurethanes characterized by a molecular weight of at least 400, and a melting point higher than 270° C. The diisocyanate generators which do not melt, but decompose when the temperature is raised, are preferably used. The diisocyanate generators do not contain functional groups which participate in polycondensation other than isocyanate groups. Typical useful diisocyanate generators include 2,2' - bis-p-N-phenoxycarbonylaminophenyl - 5,5' - bibenzimidazole, p-phenylene-2,2'-bis(4-N-phenoxycarbonylaminobenzimidazole), p,p'-biphenylene-2,2' - bis(4 - N - phenoxycarbonylaminobenzimidazole), N,N'-bis(4-N-phenoxycarbonylaminophenyl) pyromelitic imide, 4,4'-bis-2-(5 - N - phenoxycarbonylaminobenzimidazolyl)diphenylether, p-phenylene - 2,2' - bis(5-p-N-phenoxycarbonylaminophenyl)-1,3,4-oxadiazole, 2,2' - bis-m-N-phenoxycarbonylaminophenyl - 5,5' - bibenzimidazole, 2,6-di-m-N - phenoxycarbonylaminophenyl-diimidazobenzene and so on. These bisphenylurethanes are produced, for example, by reacting those diamines listed below with phenylchloroformate and the like.

The diamines to be polymerized with the diisocyanate generator have a molecular weight of at least 300 and a melting point higher than 270° C. The diamines which do not melt, but decompose when the temperature is raised, are preferably used. The diamines do not contain functional groups which participate in polycondensation other than amino groups. Typical useful diamines include 2,2'-p-diaminophenyl-5,5'-bibenzimidazole, p-phenylene-2,2'-bis(4-aminobenzimidazole), p,p' - biphenylene-2,2'-bis(4-aminobenzimidazole), N,N' - bis(4-aminophenyl)pyromelitic imide, 4,4'-bis-2-(5-aminobenzimidazolyl) diphenylether, p-phenylene - 2,2' - bis(5-p-aminophenyl)-1,3,4-oxadiazole, 2,6-di-m-aminophenyl-diimidazobenzene and so on.

The diols, another monomer to be polymerized with the diisocyanate generator, have a molecular weight of at least 100 and do not contain functional groups which participate in polycondensation other than hydroxy groups. Typical useful diols include p-xylene glycol, polyethylene glycol of from 300 to 2000 molecular weight, polypropylene glycol of the same molecular weight, dihydroxydiphenylether, trans - 1,4 - cyclohexanediol, 2-n-butyl-2-methyl-1,3-propanediol, p-phenylene-bisdimethylsilanol and so on.

The diaminodicarboxylic acids, a further monomer to be polymerized with the diisocyanate generator, have a molecular weight at least 180 and a melting point higher than 200° C. The diaminodicarboxylic acids which do not melt, but decompose when the temperature is raised, are preferably used. The diaminodicarboxylic acid do not contain functional groups which participate in polycondensation other than amino groups and carboxy groups. Typical useful diaminodicarboxylic acids include 4,4' - diaminobiphenyl - 3,3' - dicarboxylic acid, diaminoterephthalic acid, 4,4'-diamino - 3,3' - dicarboxydiphenylmethane and so on.

As monomers polymerized in accordance with the process of this invention, in addition to the above mentioned examples, many kinds of diisocyanate generator, diamine, diol and diaminodicarboxylic acid may be employed. However, it is preferable that at least one of the two kinds of monomers to be polymerized contains a benzimidazole ring, oxadiazole ring or cyclic imide linkage in the molecule and has high melting point in order to obtain a thermostable polymer. Since the process of this invention is effective when both or at least one of the monomers to be polymerized is solid at the polymerization temperature, as at least one monomer, a monomer of a high melting point which is solid at the polymerization temperature is used. By the process of this invention, polyurea is obtained from the polycondensation of diisocyanate generator with diamine, polyurethane is obtained from the polycondensation of diisocyanate generator with diol, and polyimide having quinazolinedione rings formed by the reaction of functional groups of each monomer is obtained from the polycondensation of diisocyanate generator with diaminodicarboxylic acid. These polymers are all excellent in thermostability.

According to the process of this invention, at first, the monomers to be polymerized i.e. diisocyanate generator and diamine, diisocyanate generator and diol, or diisocyanate generator and diaminodicarboxylic acid are dissolved in a solvent. At this point, both monomers are dissolved in a molar ratio of approximately 1 to 1. Useful solvents are polar solvents such as hexamethylenephosphoamide, dimethyl sulfoxide, dimethylformamide, dimethylacetamide, tetrahydrofuran and the like which are inert and in which both monomers are soluble. The quantity of the solvent to be used is more than that required to dissolve the monomers completely.

Next, a mixture of monomers is obtained by removing the solvent from the solution of monomers. As a means to obtain the mixture of monomers by the removal of the solvent, two methods are effective: one is to distill away the solvent by heating the solution of monomers under reduced pressure, and the other is to coprecipitate the monomers by adding precipitating agent to the solution of the monomers and filtering the resulting coprecipitate. In general, as the occasion demands, the mixture of monomers is obtained from the solution of monomers using either method. However, the former is used when the two kinds of monomers in the solution do not coprecipitate substantially in a molar ratio of 1 to 1 upon the addition of the precipitating agent or when one of the two kinds of monomers is liquid at a room temperature. As the precipitating agent in accordance with the latter method, water, a lower aliphatic alcohol, such as methanol, or mixtures thereof are employed.

In obtaining the mixture of monomers in accordance with the method as described above, it is desirable that the solubility of each monomer in the solvent is substantially the same as that of the other monomer. However, if the solubility in the solvent of one monomer is not the same as that of the other, it does not adversely influence the operation of the method of this invention, because the emergence of a precipitate of organic monomers of large molecular weight from the solution is not critical and the precipitate of such monomers from the solution is very fine.

If necessary, the mixture of monomers obtained in accordance with the above method is washed with, for example, water, a lower aliphatic alcohol such as methanol, or mixtures thereof and dried.

The above mixture of monomers is polymerized by polycondensation by heating in an atmosphere of an inert gas such as nitrogen and the like under atmospheric pressure at 150–400° C. for 10 minutes to 10 hours. More preferably, the polymerization is carried out by first heating under atmospheric pressure at 150–250° C. for 30 minutes to 4 hours and thereafter under reduced pressure of 1 to 100 mm. Hg at 200–350° C. for 30 minutes to 4 hours. The polymer thus obtained is, if necessary, washed with a suitable washing agent, for example, water, a lower aliphatic alcohol such as methanol, or mixtures thereof.

According to the process of this invention, polymers having a high degree of polymerization are produced from two different monomers of a high melting point which are solid at the polymerization temperature which have not been polymerized by means of conventional melt polymerization and have not been polymerized to a high degree of the polymerization by means of solution polymerization. Polymers having a high degree of polymerization are obtained in good yield in comparison with that obtained using polymerization by mechanical mixing and heating of these monomers, and a lower polymerization temperature is employed. Further, polymers obtained by the process of this invention are novel thermostable polymers consisting of monomers of a high melting point and excellent in thermostability in comparison with those obtained by conventional methods.

Example 1

A 3.23 g. quantity of 2,2'-bis-p-N-phenoxycarbonylaminophenyl-5,5'-bibenzimidazole and 2.05 g. of 2,,2'-p-diaminophenyl-5,5'-bibenzimidazole were dissolved into 9 g. of hexamethylenephosphoamide at room temperature. Methanol, in the same quantity as said hexamethylenephosphoamide, was added to the solution while stirring strongly, there is further added hot water heated up to 70° C. in an amount twice as much as the methanol used. The solution was allowed to stand for 5 hours. The resulting precipitate was filtered and washed with a solution of 2 parts by volume of water and 1 part by volume of methanol and dried to obtain a mixture of above monomers.

A 1.5 g. quantity of the thus obtained mixture of monomers was put into an elongated rounded flask fitted with a nitrogen inlet tube, and was heated in an atmosphere of nitrogen under atmospheric pressure at 210–220° C. for 4 hours using a silicone oil bath, and thereafter heated under a reduced pressure of 1 mm. Hg at 290–300° C. for 2 hours. 1.19 g. of polymer was obtained in a 96% yield after washing the contents of the flask with methanol and drying thereof. The inherent viscosity of this polymer was 0.37 measured at a concentration of 0.2 g./100 ml. in concentrated sulfuric acid at 30° C. (The same measurement is used in the following examples, Reference Example and Comparative Example.) This polymer showed good thermal stability, since its weight loss was below 5% in an atmosphere of nitrogen up to 460° C.

Example 2

A 3.37 g. quantity of p,p'-biphenylene-2,2'-bis(4-N-phenoxycarbonylaminobenzimidazole) and 2.30 g. of p,p'-biphenylene-2,2'-bis(4 - aminobenzimidazole) were dissolved into 9 g. of dimethylformamide at room temperature and a mixture of above monomers was obtained by repeating the procedure of Example 1. 1.5 g. of the mixture of monomers was polymerized by repeating the procedure of Example 1. 1.09 g. of polymer was obtained in a 97% yield, after which the polymerized mixture was washed and dried by the same procedure as in Example 1. This polymer had an inherent viscosity of 0.31. The weight loss of the polymer was below 5% in an atmosphere of nitrogen up to 410° C.

Example 3

A 3.05 g. quantity of 4,4'-bis(5-N-phenoxycarbonylaminobenzimidazolyl)diphenylether and 2.31 g. of 4,4'-bis-2-(5-aminobenzimidazolyl)diphenylether were dissolved into 9 g. of hexamethylene phosphoamide at room temperature to obtain a mixture of monomers by repeating the procedure of Example 1, and 1.8 g. of this mixture of monomers was polymerized by repeating the procedure of Example 1. 1.30 g. of polymer was obtained in a 95% yield, after which the polymerized mixture was washed and dried by the same procedure as in Example 1. This polymer had an inherent viscosity of 0.29. The weight loss of the polymer was below 5% in an atmosphere of nitrogen up to 390° C.

Example 4

A 3.6 g. quantity of 2,2'-bis-p-N-phenoxycarbonylaminophenyl-5,5'-bibenzimidazole and 0.77 g. of p-xylene glycol were dissolved into 4.7 g. of dimethylformamide at room temperature. This solution was heated gradually under a reduced pressure of 1 mm. Hg up to 150° C. to remove dimethylformamide from the solution and to obtain a mixture of above monomers.

A 2.5 g. quantity of the mixture thus obtained was put into an elongated rounded flask fitted with a nitrogen inlet tube and heated in an atmosphere of nitrogen under atmospheric pressure at 210–220° C. for 2 hours using a silicone oil bath, and further under a reduced pressure of 1 mm. Hg at 240–250° C. for 3 hours. The contents of the flask were washed with a mixture of 1 part by volume of water and 2 parts by volume of methanol and then dried. As a result, 1.80 g. of polymer was obtained in a 94% yield. The inherent viscosity of this polymer was 0.33. The weight loss of the polymer was below 5% in an atmosphere of nitrogen up to 370° C.

Example 5

A 3.09 g. quantity of 2,2'-bis-p-N-phenoxycarbonylaminophenyl-5,5'-bibenzimidazole and 1.45 g. of polyethylene glycol (molecular weight: 389) were dissolved into 7.1 g. of dimethylacetamide at room temperature. The mixture of above monomers was obtained by heating said solution gradually up to 140° C. under a reduced pressure of 1 mm. Hg for the removal of dimethylacetamide.

2.1 g. of the mixture thus obtained was put into an elongated rounded flask fitted with the nitrogen inlet tube and heated by repeating the procedure of Example 4, except that polymerization temperature was 230–240° C. under the reduced pressure of 1 mm. Hg Thereafter, the contents of the flask were washed with a mixture of water and methanol in equal parts by volume and dried. As a result, 1.60 g. of polymer was obtained in a 93% yield. This polymer had a inherent viscosity of 0.31. The weight loss of the polymer was below 5% in an atmosphere of nitrogen up to 355° C.

Example 6

A 3.28 g. quantity of 2,2'-bis-p-N-phenoxycarbonylaminophenyl-5,5'-bibenzimidazole and 1.36 g. of 4,4'-diaminophenyl-3,3'-dicarboxylic acid were dissolved into 12 g. of hexamethylenephosphoamide at room temperature. This solution was heated under reduced pressure up to 70° C. to remove the greater part of hexamethylenephosphoamide, then further heated up to 80° C. under a reduced pressure of 3 mm. Hg for 5 hours for the complete removal of hexamethylenephosphoamide. The precipitate thus formed was washed completely with a mixture of 2 parts by volume of water and 1 part by volume of methanol and dried to obtain a mixture of above monomers.

1.8 g. of this mixture of monomers was put into an elongated rounded flask fitted with the nitrogen inlet tube and heated in an atmosphere of nitrogen under atmospheric pressure at 190–200° C. for 3 hours using a silicone oil bath, and thereafter heated under a reduced pressure of 1 mm. Hg at 255–265° C. for 3 hours. 1.21 g. of polymer was obtained in a 89% yield after washing the contents of the flask with methanol and drying thereof. This polymer had an inherent viscosity of 0.31. The weight loss of the polymer was below 5% in an atmosphere of nitrogen up to 405° C.

Example 7

A 3.22 g. quantity of p,p'-biphenylene-2,2'-bis(4-N-phenoxycarbonylaminobenzimidazole) and 1.01 g. of di-aminoterephthalic acid were dissolved into 15 g. of di-methylacetamide at room temperature. Then the procedure of Example 6 was repeated to obtain a mixture of above monomers, and 2.59 g. of said mixture of monomers was polymerized by the procedure of Example 6. As a result, 1.71 g. of polymer was obtained in a 91% yield after which the polymerized mixture was washed and dried by the same procedure as in Example 6. This polymer had an inherent viscosity of 0.25. The weight loss of the polymer was below 5% in an atmosphere of nitrogen up to 387° C.

Example 8

A 1.97 g. quantity of 4,4'-bis-2(5-N-phenoxycarbonylaminobenzimidazolyl)diphenylether and 1.34 g. of 4,4'-diamino-3,3'-dicarboxydiphenylmethane were dissolved into 11 g. of hexamethylenephosphoamide at room temperature.

Then by repeating the procedure of Example 6, a mixture of above monomers was obtained.

1.61 g. of said mixture of monomers was put into an elongated rounded flask fitted with the nitrogen inlet tube and heated in an atmosphere of nitrogen under atmospheric pressure at 185–195° C. for 4 hours using a silicone oil bath, and thereafter heated under a reduced pressure of 1 mm. Hg at 240–245° C. for 7 hours. As a result 1.01 g. of polymer was obtained in a 83% yield after washing the contents of the flask with methanol and drying thereof. This polymer had an inherent viscosity of 0.19. The weight loss of the polymer was below 5% in an atmosphere of nitrogen up to 395° C.

Reference Example

The same two kinds of monomers as in Example 1 of the same quantity as in Example 1, i.e. 3.23 g. of 2,2'-bis-p - N - phenoxycarbonylaminophenyl-5,5'-bibenzimidazole and 2.05 g. of 2,2'-p-diaminophenyl-5,5'-bibenzimidazole, were put into agate mortar and mixed for 2 hours.

1.5 g. of thus obtained mixture was polymerized by the same procedure as in Example 1. 1.1 g. of polymer was obtained in a 85% yield, after the polymerized mixture was washed and dried by the same procedure as in Example 1. This polymer had an inherent viscosity of 0.18.

In this example, the polymerization was carried out under exactly same conditions as that of Example 1 except that the monomers to be polymerized were mixed mechanically. The polymer thus obtained showed a lower degree of the polymerization and was inferior in yield and in thermostability to that of Example 1.

Comparative Example

The same two kinds of monomers as in Example 1 of the same quantity as in Example 1 i.e. 3.23 g. of 2,2'-bis-p - N - phenoxycarbonylaminophenyl-5,5'-bibenzimidazole and 2.05 g. of 2,2'-p-diaminophenyl-5,5'-bibenzimidazole, were put into the same type flask as in Example 1 and then 11 cc. of dimethylacetamide was added thereto, and then the solution was heated in an atmosphere of nitrogen under atmospheric pressure at 155° C. for 20 hours. Thereafter, 5 cc. of methanol was added into the above solution and stirred. Further 15 cc. of water was added into the solution and then allowed to stand for 5 hours. The precipitate thus obtained was filtered and washed with a mixture of water and methanol in the same quantity and dried. As a result, 3.85 g. of polymer was obtained in a 87% yield. This polymer had an inherent viscosity of 0.09.

In this example, in polymerizing the same monomers as in Example 1, solution polymerization was carried out, and polymer thus obtained had a lower degree of the polymerization and was inferior in yield and in thermostability to that obtained in Example 1.

What is claimed is:

1. A process for the production of thermostable polymers which comprises dissolving a bisphenylurethane having a molecular weight of at least 400 and a melting point higher than 270° C. and a monomer selected from the group consisting of diamine, diol and diaminodicarboxylic acid, at least one of the starting materials being solid at the polymerization temperature, in a solvent, thereafter removing the solvent from the resulting solution to obtain a mixture of above monomers which are intimately mixed at a molecular level, and polymerizing the said mixture of the monomers in a solid phase by heating.

2. The process of claim 1 wherein the bisphenylurethane and the monomer selected from the group consisting of diamine, diol and diaminodicarboxylic acid are present in a molar ratio of about 1 to 1.

3. The process of claim 1 wherein, in obtaining the mixture of monomers by the removal of the solvent from the solution, the mixture of monomers is obtained by adding a precipitating agent to the solution to coprecipitate the monomers and then filtering the resulting coprecipitate.

4. The process of claim 3 wherein the coprecipitate after the filtering is washed with a washing agent.

5. The process of claim 1 wherein, in obtaining the mixture of monomers by the removal of the solvent from the solution, the mixture of monomers is obtained by heating the solution under reduced pressure to distill off the solvent from the solution.

6. The process of claim 5 wherein the precipitate obtained by heating the solution under reduced pressure to distill off the solvent from the solution is washed with a washing agent.

7. The process of claim 1 wherein the mixture of monomers is polymerized in a solid phase by heating the mixture of monomers at a temperature of from 150° C. to 400° C.

8. The process of claim 7 wherein the mixture of monomers is heated at a temperature of from 150° C. to 250° C. under atmospheric pressure and further at a temperature of from 200° C. to 350° C. under reduced pressure.

9. The process of claim 1 wherein the mixture of monomers is heated in an atmosphere of an inert gas.

10. The process of claim 1 wherein said bisphenylurethane is at least one member selected from the group consisting of 2,2'-bis-p-N-phenoxycarbonylaminophenyl-5,5'-bibenzimidazole,
p-phenylene-2,2'-bis(4-N-phenoxy-carbonylaminobenzimidazole),
p,p'-biphenylene-2,2'-bis(4-N-phenoxycarbonylaminobenzimidazole),
N,N'-bis(4-N-phenoxycarbonylaminophenyl) pyromelitic imide,
4,4'-bis-2-(5-N-phenoxycarbonylaminobenzimidazolyl)diphenylether,
p-phenylene-2,2'-bis(5-p-N-phenoxycarbonylaminophenyl)-1,3,4-oxadiazole,
2,2'-bis-m-N-phenoxycarbonylaminophenyl-5,5'-bibenzimidazole and
2,6-di-m-N-phenoxycarbonylaminophenyl-diimidazobenzene.

11. The process of claim 1 wherein said monomer is a diamine having a molecular weight of at least 300 and a melting point higher than 270° C.

12. The process of claim 11 wherein said diamine is one which does not melt but decomposes at elevated temperatures.

13. The process of claim 12 wherein said diamine is at least one member selected from the group consisting of 2,2'-p-diaminophenyl-5,5'-bibenzimidazole, p-phenylene - 2,2' - bis(4-aminobenzimidazole), p,p'-biphenylene-2,2' - bis(4 - aminobenzimidazole), N,N'-bis(4-aminophenyl) pyromelitic imide, 4,4'-bis-2-(5-aminobenzimidazoly)diphenylether, p - phenylene - 2,2'-bis(5-p-aminophenyl) - 1,3,4 - oxadiazole, 2,2' - m-diaminophenyl-5,5'-bibenzimidazole and 2,6 - di - m-aminophenyl-diimidazobenzene.

14. The process of claim 1 wherein said monomer is a diol having a molecular weight of at least 100.

15. The process of claim 14 wherein said diol is at least one member selected from the group consisting of p-xylene glycol, polyethylene glycol and polypropylene glycol of from 300 to 2000 molecular weight, dihydroxydiphenylether, trans - 1,4 - cyclohexanediol, 2-n-butyl-2-methyl - 1,3 - propanediol and p-phenylene-bisdimethylsilanol.

16. The process of claim 1 wherein said monomer is a diaminodicarboxylic acid having a molecular weight of at least 180 and a melting point higher than 200° C.

17. The process of claim 16 wherein said diaminodicarboxylic acid is one which does not melt but decomposes at elevated temperatures.

18. The process of claim 17 wherein said diaminodicarboxylic acid is at least one member selected from the group consisting of 4,4'-diaminobiphenyl-3,3'-dicarboxylic acid, diaminoterephthalic acid and 4,4'-diamino-3,3'-dicarboxydiphenylmethane.

19. A process for the production of thermostable polymers which comprises dissolving a bisphenylurethane having a molecular weight of at least 400 and a melting point higher than 270° C. and a monomer selected from the group consisting of at least one diamine having a molecular weight of at least 300 and a melting point higher than 270° C., at least one diol having a molecular weight of at least 100 and at least one diaminodicarboxylic acid having a molecular weight of at least 180 and a melting point higher than 200° C., in a solvent, at least one of the starting materials being solid at the polymerization temperature, removing the solvent from the resulting solution to obtain a mixture of said bisphenylurethane and monomer which are intimately mixed at the molecular level, and polymerizing said mixture at a temperature between 150 and 400° C. in a solid phase.

20. The process of claim 19 wherein said bisphenylurethane and said monomer are present in a mole ratio of about 1 to 1.

References Cited

Saunders et al.: Polyurethanes, Part II, Interscience, N.Y., 1964, pp. 611 and 612.

DONALD E. CZAJA, Primary Examiner

M. J. WELSH, Assistant Examiner

U.S. Cl. X.R.

260—77.5 AM, 77.5 TB, 77.5 AP